United States Patent Office 3,393,159
Patented July 16, 1968

3,393,159
BICYCLOBUTANE CARBONITRILE HOMOPOLYMERS AND PROCESS FOR PREPARING THE SAME
Elwood P. Blanchard, Jr., Wilmington, Del., assignor to E. I. du Pont de Nemours and Company, Wilmington, Del., a corporation of Delaware
No Drawing. Filed July 28, 1965, Ser. No. 475,573
5 Claims. (Cl. 260—2)

ABSTRACT OF THE DISCLOSURE

Disclosed and claimed are homopolymers of 1-cyano-3-alkylbicyclo[1.1.0]butanes and their preparation by polymerization of the monomer in the presence of organo alkali metal anionic initiator. The homopolymers form self-supporting films and fibers.

FIELD OF THE INVENTION

This invention relates to polymeric materials and more particularly to polymers comprised of repeat units having a 1-cyano-3-hydrocarbyl-1,3-cyclobutylene structure, and to the preparation of such polymers.

DESCRIPTION OF THE INVENTION

The 1 - cyano - 3 - hydrocarbylbicyclo[1.1.0]butanes are members of an unusual class of organic compounds described and claimed in my U.S. Patent 3,234,264, of Feb. 8, 1966. As further disclosed therein, these compounds may be pyrolyzed, with scission of both the cyclopropane rings as well as the cyclobutane ring, to yield substituted 1,3-butadienes which are useful as monomers for the preparation of polymers. As part of the present invention it has been discovered that 1-cyano-3-hydrocarbylbicyclo[1.1.0]butanes can be converted to homopolymers with retention of the cyclobutane ring structure.

The homopolymers of this invention are prepared from 1-cyano-3-hydrocarbylbicyclo[1.1.0]butanes having the formula

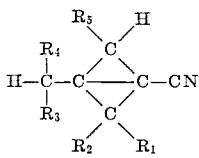

wherein $R_1$, $R_2$, $R_3$, $R_4$ and $R_5$ each is selected from the group consisting of hydrogen and hydrocarbyl which is free of aliphatic unsaturation and which has 1–18 carbon atoms. The polymers obtained by this invention are comprised of recurring or repeat units having the formula

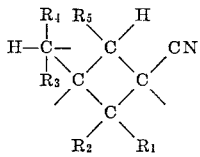

wherein $R_1$, $R_2$, $R_3$, $R_4$ and $R_5$ are as defined above.

The term "hydrocarbyl" as used throughout the present specification and claims in synonymous with the term "hydrocarbon radical," i.e., an organic radical consisting only of carbon and hydrogen atoms. Exempli gratia, $R_1$, $R_2$, $R_3$, $R_4$ and $R_5$, in addition to hydrogen, may be alkyl, cycloalkyl, aryl, alkaryl or aralkyl. The only prerequisites for the aforesaid hydrocarbyl groups are that the groups must be free of aliphatic carbon-to-carbon unsaturation and must contain 1–18 carbon atoms. Preferred herein are hydrocarbyl groups containing 1–12 carbon atoms, and particularly preferred are those containing 1–6 carbon atoms. Illustrative hydrocarbyl groups as defined hereinabove include alkyl groups, such as methyl, ethyl, t-butyl, hexyl, isooctyl, dodecyl, octadecyl and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl and the like; aryl groups such as phenyl, naphthyl, anthryl, p-phenylphenyl, p-biphenylphenyl, naphthacenyl, benzanthryl, chrysenyl and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenylethyl, diphenylmethyl, α-naphthylethyl, 2-(2-anthryl)-ethyl, 4-(2-anthryl)butyl and the like.

The homopolymers of this invention are prepared by an addition polymerization of a 1-cyano-3-hydrocarbylbicyclo[1.1.0]butane of the formula given above (also known as a 3-hydrocarbylbicyclo[1.1.0]butane carbonitrile), in bulk or in solution in an inert organic solvent, at a temperature of −15° to 100° C., in the presence of an anionic initiator.

Suitable solvents for the polymerization include ethers, for example, diethyl ether, tetrahydrofuran, and the dimethyl ether of ethylene glycol; hydrocarbons, for example, benzene and hexane; chlorinated hydrocarbons, for example chlorobenzene; and amides, for example, dimethylformamide. The ethers are the preferred solvents in the preparation of polymers solely of the cyclobutane variety.

A wide variety of anionic initiators are operable herein for the polymerization of the bicyclobutanes. Representative anionic initiators that can be used include the alkali metal alkyls, for example, n-butyllithium and methyllithium; the alkali metal alkoxides, for example, potassium t-butoxide and sodium methoxide; and the alkali metal aryls, for example, sodium naphthalene. The concentration of anionic initiator employed can range from 0.01 to 10 weight percent of the monomer being polymerized. The order of addition of the monomer and the initiator is not critical. Polymerization times can range from one hour to several days, for example, two to three days, or more.

The 1-cyano-3-hydrocarbylbicyclo[1.1.0]butanes used in the preparation of the polymers of this invention can be prepared by reacting a 1-cyano-3-alkylidenecyclobutane with hydrogen iodide at 0° to 200° C. to first form a 1-cyano-3-iodo-3-alkylcyclobutane, and then reacting the iodo compound with an alkali metal hydride suspended in a hydrocarbon oil at 0° to 100° C., and thereafter separating by conventional means the desired bicyclobutane. The 1-cyano-3-alkylidenecyclobutane may be prepared by the process described in U.S. Patent 2,914,541. Exemplification of the process of preparing the bicyclobutane monomers used in this invention is included in Example I.

The products of this invention are illustrated in further detail in the following examples in which proportions of ingredients are expressed in parts by weight unless otherwise stated. The examples are not intended to limit in any way the scope of the invention.

Example 1

Part A.—To 90 parts of 55–58 percent hydriodic acid was added with stirring 18.6 parts of 3-methylenecyclobutanecarbonitrile. The mixture was stirred for ½ hr. and then the lower layer was separated, diluted with ether and dried over magnesium sulfate. Filtration followed by distillation of the filtrate gave 22.2 parts of 3-iodo-3-cyclobutanecarbonitrile, B.P. 63–66° C./1 mm.

Part B.—To a stirred slurry of 2.12 parts of a 56 weight percent sodium hydride in mineral oil dispersion and 35.5 parts of diethyl ether was added 11.05 parts of 3-iodo-3-methylcyclobutanecarbonitrile. The mixture was heated at reflux with stirring for 64 hours, cooled to about 0° C. and then diluted with 4 parts of methanol followed by 30 parts of water. The ether phase was separated, dried over magnesium sulfate and distilled to give 3 parts of 1-cyano - 3-methylbicyclo[1.1.0]butane, B.P. 66–67° C./32 mm.

Part C.—Into a dry flask was charged 6.6 parts of hexane and 0.92 part of 3-methylbicyclo[1.1.0]butanecarbonitrile (1 - cyano - 3 - methylbicyclo[1.1.0]butane). The mixture was cooled, under dry nitrogen, to −78° C. and 7.1 parts of ethyl ether was added, followed by 0.0033 part of a 15.27% by weight solution of n-butyllithium in hexane. After stirring for 6 hours at −78° C., an additional 0.0033 part of a 15.27% by weight solution of n-butyllithium in hexane was added and the mixture was stirred at 25° C. for 64 hours. Filtration gave 0.09 part of poly - 3-methylbicyclo[1.1.0]butanecarbonitrile as a buff powder.

Example 2

A reactor, consisting of a round-bottom, sideneck flask (fitted with a rubber septum) containing a magnetic stirrer bar and equipped with a condenser with connections thereto to permit evacuation and purging with dry nitrogen, was dried by baking overnight at 150° C. The reactor was then cooled to −78° C. under a dry nitrogen atmosphere and 17.8 parts of anhydrous tetrahydrofuran, 1.84 parts of 3-methylbicyclo[1.1.0]butanecarbonitrile, and 0.12 part of a 15% solution of n-butyllithium in hexane were introduced. Stirring was commenced and the mixture was warmed to and held at 0° C. with an ice bath. Stirring was continued for one hour at 0° C., the reaction mixture was washed into about 237 parts of methanol, and the slurry was stirred for about 3 minutes in a high-speed blender and then filtered. The product was again stirred in methanol and finally stirred once in distilled water in the blender and then dried in a vacuum desiccator at room temperature with continued pumping. The poly - 3-methylbicyclo[1.1.0]butanecarbonitrile obtained in essentially quantitative yield as a white powder, had an inherent viscosity, $\eta_{inh.}$, of 1.09 and a relative viscosity (10% in hexafluoroisopropyl alcohol) of about 60. The polymer exhibited a M.P. of ca. 360° C. (with dec.).

Example 3

By the general procedure of Example 2, 1.84 parts of 3-methylbicyclo[1.1.0]butanecarbonitrile in 13.2 parts of tetrahydrofuran was treated with 1.95 parts of a one weight percent solution of potassium t-butoxide in dry tetrahydrofuran. The mixture was heated at reflux under nitrogen for 16 hours and then evaporated to dryness. The residue was washed with methanol and collected on a filter to give 0.03 part of poly-3-methylbicyclo[1.1.0]butanecarbonitrile, which had an inherent viscosity, $\eta_{inh.}$, of 0.37 at 0.1% concentration in trifluoroacetic acid at 25° C.

Example 4

By the procedure of Example 2, a solution of 1.84 parts of 3-methylbicyclo[1.1.0]butanecarbonitrile in 17.8 parts of tetrahydrofuran was treated with one part of a solution of sodium naphthalene in tetrahydrofuran (prepared by reacting a solution of 5 parts of naphthalene in 88 parts of tetrahydrofuran with 5 parts of 30% by weight dispersion of sodium in xylene) and stirred at 0° C. for 1 hour and finally at 25° C. for 18 hours. Work-up in the manner of Example 2 gave an essentially quantitative yield of poly - 3-methylbicyclo[1.1.0]butanecarbonitrile which had an $\eta_{inh.}$ of 0.37 at 0.1% concentration in trifluoroacetic acid at 25° C.

Example 5

By the general procedure of Example 2, a solution of 8.8 parts of 3-methylbicyclo[1.1.0]butanecarbonitrile in 75 parts of tetrahydrofuran was cooled and stirred at 0° C. and treated with 0.4 part of a 5.21% by weight solution of methyllithium in ether. The mixture was stirred for 2 hours at 0° C. and 18 hours at 25° C. Work-up in the manner described in Example 2 gave 8.45 parts of poly-3-methylbicyclo[1.1.0]butanecarbonitrile which had an $\eta_{inh.}$ of 0.80 at 0.1% concentration in trifluoroacetic acid at 25° C.

Example 6

By the procedure of Example 2, a solution of 1.84 parts of 3-methylbicyclo[1.1.0]butanecarbonitrile in 22 parts of anhydrous chlorobenzene was treated with 0.033 part of a 15% solution of n-butyllithium in hexane and stirred at room temperature for 18 hours. Work-up in the usual manner gave 0.93 part of poly-3-methylbicyclo[1.1.0]butanecarbonitrile which had an $\eta_{inh.}$ of 0.40 at 0.1% concentration in trifluoroacetic acid at 25° C.

Example 7

By the general procedure of Example 2, a solution of 1.84 parts of 3-methylbicyclo[1.1.0]butanecarbonitrile in 33 parts of 2,2-bis-trifluoromethyl - 1,3 - dioxolane was treated with 0.12 part of a 15% solution of n-butyllithium in hexane at −30° C. The mixture was stirred at −30° C. for 2 hours and then at 25° C. for 16 hours. Work-up in the usual manner gave 0.117 part of poly-3-methylbicyclo]1.1.0]butanecarbonitrile which had an $\eta_{inh.}$ of 0.16 at 0.1% concentration in trifluoroacetic acid at 25° C.

Example 8

By the general procedure of Example 2, a solution of 1.84 parts of 3-methylbicyclo[1.1.0]butanecarbonitrile in 17.8 parts of ethylene glycol dimethyl ether was treated with 0.46 part of a solution of sodium naphthalene in tetrahydrofuran (as described in Example 4) and was stirred at 0° C. for 3 hours and finally for 18 hours at room temperature. Work-up by the usual procedure gave essentially a quantitative yield of poly-3-methylbicyclo[1.1.0]butanecarbonitrile which had an $\eta_{inh.}$ of 0.3 at 0.1% concentration in trifluoroacetic acid at 25° C.

Example 9

Using the equipment described in Example 2, the reaction vessel was charged with 1.84 parts of 3-methylbicyclo[1.1.0]butanecarbonitrile. The monomer was cooled to −35° C. and 0.12 part of 15% n-butyllithium in hexane was added with stirring. The mixture was held at −5° to −10° C. for 30 minutes whereupon a gelatinous mass resulted. On warming to 0° C., an exothermic reaction occurred. After 15 minutes at room temperature, the polymer was worked up in the usual manner to give 1.25 parts of poly - 3-methylbicyclo[1.1.0]butanecarbonitrile which had an $\eta_{inh.}$ of 0.37 at 0.1% concentration in trifluoroacetic acid at 25° C.

The high molecular weight polymers of this invention are believed to consist of a plurality of substituted cyclobutanecarbonitrile repeat units

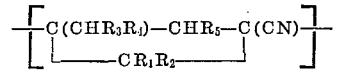

which are joined to one another at the 1- and 3-positions of the ring. The cyano and hydrocarbyl substituents attached at the 1- and 3-positions thus may be cis or trans with respect to each other, i.e.

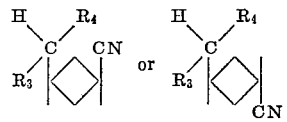

This proposed polymer structure is supported by analytical data obtained on the products of the preceding examples. The infrared spectrum of the polymer from Example 2 is that of a saturated hydrocarbon system with a cyano group (2240 cm.$^{-1}$) and a methyl group (1375 cm.$^{-1}$). Absent is absorption indicative of ethylenic unsaturation (1600–1700 cm.$^{-1}$) or the cyclopropyl group (3050–3090 cm.$^{-1}$, 1000–1020 cm.$^{-1}$). The proton N.M.R. spectrum of this polymer exhibits resonances centered at 8.6τ and 8.3τ (CH$_3$ groups in cis and trans positions relatiev to the CN group) and 7.5τ (CH$_2$ groups in the 2- and 4-positions of the cyclobutane ring) with approximate areas of 3 (8.6 and 8.3τ) and 4 (7.5τ).

The above examples have illustrated the products of this invention by reference to homopolymers of 3-methylbicyclo[1.1.0]butanecarbonitrile. However, this invention includes homopolymers of any 1-cyano-3-hydrocarbylbicyclo[1.1.0]butane of the formula given hereinbefore. For example, homopolymers of the cyanohydrocarbylbicyclo[1.1.0]butanes listed below in Table I are obtained when the 3-methylbicyclo[1.1.0]butanecarbonitrile of Examples 1–9 is replaced by the cyanohydrocarbylbicyclobutanes listed in Table I and polymerized in accordance with the procedures described in Examples 1–9:

Table I.—1-cyano-3-hydrocarbylbicyclo[1.1.0]butanes 3-methyl-2-phenylbicyclo[1.1.0]butanecarbonitrile
2,2-diethyl-3-methylbicyclo[1.1.0]butanecarbonitrile
3-isopropylbicyclo[1.1.0]butanecarbonitrile
2,2-di(n-butyl)-3,4-dimethylbicyclo[1.1.0]butanecarbonitrile
2-methyl-3-(5-nonyl)bicyclo[1.1.0]butanecarbonitrile
2-dodecyl-3-methyl-4-phenylbicyclo[1.1.0]butanecarbonitrile
2-phenyl-3-tridecylbicyclo[1.1.0]butanecarbonitrile
2-n-butyl-3-(9-heptadecyl)-4-methylbicyclo[1.1.0]butanecarbonitrile
4-decyl-3-isopropyl-2,2-dimethylbicyclo[1.1.0]butanecarbonitrile
4-cyclohexyl-2-cyclopropyl-2,3-dimethylbicyclo[1.1.0]butanecarbonitrile
3-cyclohexylmethyl-2-cyclopropyl-2-methylbicyclo[1.1.0]butanecarbonitrile
2-benzyl-2,3-dimethyl-4-tridecylbicyclo[1.1.0]butanecarbonitrile
2-benzyl-2-methyl-3-tetradecylbicyclo[1.1.0]butanecarbonitrile
3-methyl-2,2-diphenylbicyclo[1.1.0]butanecarbonitrile
3-methyl-2-(β-naphthyl)bicyclo[1.1.0]butanecarbonitrile
2-(α-naphthyl)-2-phenyl-3-(1-phenyl-1-p-tolyl)methylbicyclo[1.1.0]butanecarbonitrile The polymers of this invention, i.e., the high melting homopolymers, and especially those having an inherent viscosity of at least 0.1, are useful in a wide variety of applications, e.g., in coating compositions and in the form of self-supporting films and fibers.

More particularly, films can be prepared, for example, from poly-3-methylbicyclo[1.1.0]butanecarbonitrile (prepared by the procedure of Example 2) by conventional film-casting techniques using solutions in hexafluoroisopropyl alcohol. These films are especially useful as electrical insulation. Film prepared from the product of Example 2 exhibits a dielectric constant of 3.80 and a dissipation factor of 0.006. Its dielectric strength averages 3420 volts/mil and its volume resistivity is 3×10$^{15}$ ohm-cm.

As further exemplification of the utility of the polymers of this invention, solutions of poly-3-methylbicyclo[1.1.0]butanecarbonitrile in hexafluoroisopropyl alcohol are dry-spun into fibers which are drawn at elevated temperatures. For example, fibers prepared in this way from a poly-3-methylbicyclo[1.1.0]butanecarbonitrile (prepared by the procedure of Example 2) can be drawn approximately four times at a temperature of 195° C. The drawn fibers have the following properties:

Tensile/elongation, 70° C., 65% R.H.
                                     g.p.d./11%__ 1.5–1.6
Modulus _____g.p.d__ 40–46
Tensile/elongation, 90° C., wet ___g.p.d./39%__ 0.84
Modulus, 90° C., wet _____g.p.d__ 17
Boil-off shrinkage _____percent__ 8.8

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The homopolymer comprised of a plurality of cyclobutanecarbonitrile repeat units having the structure

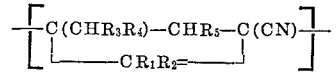

wherein each of R$_1$, R$_2$, R$_3$, R$_4$ and R$_5$ is selected from the group consisting of hydrogen and hydrocarbyl which is free of aliphatic unsaturation and which has 1–18 carbon atoms.

2. The homopolymer of claim 1 wherein R$_1$, R$_2$, R$_3$, R$_4$ and R$_5$ are hydrogen.

3. The process of preparing the polymers of claim 1 which contain only identical cyclobutanecarbonitrile repeat units which comprises the steps of polymerizing a 1-cyano-3-hydrocarbylbicyclo[1.1.0]butane having the structure

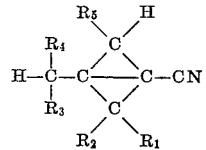

wherein R$_1$, R$_2$, R$_3$, R$_4$ and R$_5$ are as defined in claim 1, and at a temperature of −15° to 100° C., in the presence of 0.01 to 10 percent, based upon the weight of said bicyclobutane being polymerized, of an organo alkali metal anionic initiator, and thereafter recovering said cyclobutanecarbonitrile polymer.

4. The process of claim 3 wherein R$_1$, R$_2$, R$_3$, R$_4$ and R$_5$ are hydrogen and the anionic initiator is an alkali metal alkyl.

5. The homopolymer of claim 1 consisting of poly-3-methylbicyclo[1.1.0]butanecarbonitrile.

References Cited

UNITED STATES PATENTS 3,234,264  2/1966  Blanchard _____ 260—414

OTHER REFERENCES

Wiberg: Bicyclo[1.1.0]butane, in Record of Chemical Progress, 26 (3), 143–154, September 1965.

Wiberg: Bicyclo[1.1.0]butane, in Tetrahedron 21 (10), 2749–2769, October 1965.

JOSEPH L. SCHOFER, *Primary Examiner.*

J. C. HAIGHT, *Assistant Examiner.*

UNITED STATES PATENT OFFICE
CERTIFICATE OF CORRECTION

Patent No. 3,393,159                             July 16, 1968

Elwood P. Blanchard, Jr.

It is certified that error appears in the above identified patent and that said Letters Patent are hereby corrected as shown below:

Column 1, lines 54 to 61, the left-hand portion of the formula should appear as shown below:

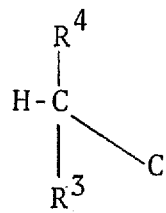

Column 6, line 25, that portion of the formula reading $CR_1R_2=$ should read $CR_1R_2-$ Signed and sealed this 9th day of December 1969.

(SEAL)
Attest:

EDWARD M. FLETCHER, JR.                        WILLIAM E. SCHUYLER, JR.
Attesting Officer                                   Commissioner of Patents